United States Patent
Li et al.

(10) Patent No.: US 9,407,567 B2
(45) Date of Patent: Aug. 2, 2016

(54) ENABLING EXTERNAL ACCESS TO MULTIPLE SERVICES ON A LOCAL SERVER

(71) Applicant: Telefonaktiebolaget L M Ericsson (PUBL), Stockholm (SE)

(72) Inventors: Qiang Li, Taby (SE); Andreas Cleverdal, Alvsjo (SE); Ioannis Fikouras, Stockholm (SE); Tomas Holm, Alvsjo (SE); Lars-Orjan Kling, Sodertalje (SE); Joerg Niemoeller, Sundbyberg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 13/810,807

(22) PCT Filed: Dec. 24, 2012

(86) PCT No.: PCT/EP2012/076879
§ 371 (c)(1),
(2) Date: Jan. 17, 2013

(87) PCT Pub. No.: WO2014/101935
PCT Pub. Date: Jul. 3, 2014

(65) Prior Publication Data
US 2015/0089061 A1 Mar. 26, 2015

(51) Int. Cl.
*G06F 15/16* (2006.01)
*H04L 12/911* (2013.01)
(Continued)

(52) U.S. Cl.
CPC ............... *H04L 47/70* (2013.01); *H04L 29/06* (2013.01); *H04L 29/08072* (2013.01);
(Continued)

(58) Field of Classification Search
CPC ........................ H04L 29/06; H04L 29/08072
USPC .................. 709/217, 220, 227; 370/252, 261
See application file for complete search history.

(56) References Cited

U.S. PATENT DOCUMENTS 7,715,324 B1 * 5/2010 Harvell et al. ................. 370/252
8,724,528 B2 * 5/2014 Velev et al. ................... 370/310
(Continued)

FOREIGN PATENT DOCUMENTS

WO       2012103938 A1    8/2012

OTHER PUBLICATIONS

Written Opinion of the International Preliminary Examining Authority dated Jan. 15, 2015, in International Application No. PCT/EP2012/076879, 10 pages.

(Continued)

*Primary Examiner* — Khanh Dinh
(74) *Attorney, Agent, or Firm* — Rothwell, Figg, Ernst & Manbeck, P.C.

(57) ABSTRACT

Apparatus for operating as a server node within a private IP network to host or aggregate a plurality of resources. The apparatus comprises an address controller for obtaining a private IP network IP address, for allocating a server node port number to said resources, and for causing the server node to listen on that server node port. A resource configurator is provided for determining for each of said resources a resource private Uniform Resource Identifier, URI, or URI path together with resource metadata, and for sending to a gateway, interconnecting the private IP network with a public IP network, an advertisement containing said private URI or URI path and respective resource metadata. The apparatus further comprises a resource request receiver for receiving requests at said server node port, for identifying private URIs or URI paths included within the requests, and for delivering resources corresponding to said URI or URI paths.

23 Claims, 13 Drawing Sheets

(51) Int. Cl.
H04L 29/06 (2006.01)
H04L 29/08 (2006.01)
H04L 29/12 (2006.01)
H04W 4/00 (2009.01)

(52) U.S. Cl.
CPC ....... *H04L 61/1511* (2013.01); *H04L 61/2076* (2013.01); *H04L 61/2514* (2013.01); *H04L 61/2567* (2013.01); *H04L 69/14* (2013.01); *H04W 4/005* (2013.01); *H04L 61/3025* (2013.01)

(56) References Cited

U.S. PATENT DOCUMENTS

| | | | | |
|---|---|---|---|---|
| 9,118,733 | B2* | 8/2015 | Lowekamp | H04L 67/1089 |
| 9,167,486 | B2* | 10/2015 | Bachmann | H04L 63/164 |
| 2007/0002780 | A1* | 1/2007 | Pessi | 370/261 |
| 2009/0172035 | A1* | 7/2009 | Lessing et al. | 707/104.1 |
| 2010/0250701 | A1* | 9/2010 | Harvell et al. | 709/217 |
| 2014/0226565 | A1* | 8/2014 | Velev et al. | 370/328 |

OTHER PUBLICATIONS

Cheshire et al. "DNS-Based Service Discovery" Internet Engineering Task Force, 2011, 54 pages.

"M2M Node Discovery—DNS-SD Procedure" Interdigital Communications, 2012, 8 pages.

Mealling "Dynamic Delegation Discovery System (DDDS) Part Four: The Uniform Resource Identifiers (URI) Resolution Application" Network Working Group, 2002, 18 pages.

International Search Report and the Written Opinion of the International Searching Authority dated Oct. 15, 2013, in International Application No. PCT/EP2012/076879, 16 pages.

"Machine-to-Machine communications (M2M); Functional architecture" ETSI TS 102 690 V1.1.1, 2011, European Telecommunications Standards Institute (ETSI), 280 pages.

3rd Generation Partnership Project; Technical Specification Group Services and System Aspects; System Improvements for Machine-Type Communications (MTC) (Release 11), 3GPP TR 23.888 V11.0.0, 2012, 165 pages.

Jimenez et al. "A Constrained Application Protocol(CoAP) Usage for REsource LOcation and Discovery (Reload) draft-jimenez-p2psip-coap-reload-02" Internet Engineering Task Force, IETF, Standard Working Draft, Internet Society (ISOC), 2012, 18 pages.

Gulbrandsen et al. "A DNS RR for specifying the location of services (DNS SRC)" Network Working Group, 2000, 13 pages.

Rosenbaum "Using the Domain Name System to Store Arbitrary String Attributes" Network Working Group, 1993, 4 pages.

M. Mealling, "Dynamic Delegation Discovery System (DDDS) Part One: The Comprehensive DDDS," The Internet Society, Oct. 2002, 6 pages.

M. Mealling, "Dynamic Delegation Discovery System (DDDS) Part Two: The Algorithm," The Internet Society, Oct. 2002, 15 pages.

M. Mealling, "Dynamic Delegation Discovery System (DDDS) Part Three: The Domain Name System (DNS) Database," The Internet Society, Oct. 2002, 14 pages.

M. Mealling, "Dynamic Delegation Discovery System (DDDS) Part Five: URI.ARPA Assignment Procedures", The Internet Society, Oct. 2002, 10 pages.

Yaron Y. Goland et al., "Simple Service Discovery Protocol/1.0 Operating without an Arbiter," Internet Engineering Task Force, Internet Draft, Oct. 28, 1999, 18 pages.

Z. Shelby, et al., "Constrainted Application Protocol (CoAP)," CoRE Working Group, Internet-Draft, Jan. 24, 2011, 75 pages.

"Service Learning Protocol," Wikipedia, http://en.wikipedia.org/wiki/Service_Location_Protocol, retrieved Apr. 4, 2015, 5 pages.

"Machine-to-Machine communications (M2M); Functional architecture" ETSI TS 102 690 V1.1.11, 2012, European Telecommunications Standards Institute (ETSI), pp. 15-16, 37-40, 49-120, 207-208, and 223-226.

* cited by examiner

| | | | Pref | Weight | Port | Target | TXT |
|---|---|---|---|---|---|---|---|
| _/sensor/temp._https._tcp.imsi_x.oper.com | IN | SRV | 0 | 0 | 53879 | imsi_x.oper.com | path=/sensor/temp; resourcetype="temparatureSensor"; unit="C"; location="mexicocity" |
| /sensors/light._https._tcp.imsi_x.oper.com | IN | SRV | 0 | 0 | 53879 | imsi_x.oper.com | path=/sensors/light; resourcetype="LightLux" |
| /rcr/RemoteControlReceiver.xml._https._tcp.imsi_x.oper.com | IN | SRV | 0 | 0 | 53879 | imsi_x.oper.com | path= /rcr/RemoteControlReceiver.xml; resourcetype="rootdevice"; uuid=" 55221034-bbc0-ccb8-0855-509e4f8a91ca" |

Figure 6

| | Order | Pref | Flags | Service | Regexp | Replacement |
|---|---|---|---|---|---|---|
| IN NAPTR | 100 | 10 | "s" | "i2Ls+i2Rs" | "" | https.tcp.imsi_x.oper.com |
| IN NAPTR | 100 | 10 | "s" | "i2Ls+i2Rs" | "" | http.tcp.imsi_x.oper.com |
| IN NAPTR | 100 | 10 | "s" | "i2Ls+i2Rs" | "" | coap.udp.imsi_x.oper.com |
| IN NAPTR | 100 | 10 | "s" | "i2Ls+i2Rs" | "" | snmp.udp.imsi_x.oper.com |
| IN NAPTR | 100 | 10 | "s" | "i2Ls+i2Rs" | "" | ldap.tcp.imsi_x.oper.com |

Figure 7

ENABLING EXTERNAL ACCESS TO MULTIPLE SERVICES ON A LOCAL SERVER

CROSS REFERENCE TO RELATED APPLICATION(S)

This application is a 35 U.S.C. §371 National Phase Entry Application from PCT/EP2012/076879, filed Dec. 24, 2012, designating the United States, the disclosure of which is incorporated herein in its entirety by reference.

TECHNICAL FIELD

The present invention relates to enabling access to multiple services of a local server, where the local server is located within a private network, and the access attempt is made by an application outside of that private network. It is applicable in particular to the case where the private network is connected to a public network, such as the Internet, via a Network Address Translator (NAT) function.

BACKGROUND

Currently implemented communication systems for mobile devices allow users to easily access data services in addition to the traditional telephony services. Commonly used data services include email and web browsing. These existing data services rely on the mobile device acting as client, with data being requested (either directly or by subscription to a relevant service) and subsequently pushed to the mobile device from a network server (based for example in the network operator's domain or in the wider Internet).

Machine-to-machine (m2m) refers to the exchange of information between devices substantially without the need for human intervention. Such communication may be facilitated by the data services offered by existing mobile communication networks. By way of an example, a domestic electricity meter may be coupled to a mobile device (with SIM card installed) in order to periodically send electricity meter readings to a central server of an electricity supply company, via a mobile communication network to which the mobile device has access. Such services work well where it is the device which initiates the communication. It may be difficult however to implement services which require the central server (or other remote point) to initiate the communication. Considering again the above example, this scenario might arise when a user detects a fault with his or her meter and reports this to the supply company, whereupon the supply company wishes to poll the user's home electricity meter to obtain various data therefrom.

In today's Internet, IPv4 address space is severely limited given that an IPv4 address is composed of 32 bits. Despite the standardisation of IPv6 with a much greater address space, legacy issues (particularly associated with Internet routers) mean that IPv4 remains dominant. Mobile network operators must therefore live with the constraints of IPv4. In particular, operators have had to find a way to allow the many millions of mobile users to access IP data services despite the fact that the operators themselves are allocated only a relatively small number of unique IPv4 addresses. This is generally achieved using a process known as Network Address Translation, whereby the mobile devices are located behind a Network Address Translator (NAT). Within the operator's domain, private IP addresses are used to identify connected mobile devices. These private IP addresses are unique only within the operator's domain. The NAT allocates external IP addresses and ports (from a pool of available addresses and ports) as and when required by mobile devices. Using 3GPP terminology, this IP address allocation will likely occur at Packet Data Protocol (PDP) context creation. Typically, multiple mobile devices will share a single external IP address. A mobile device will randomly select a so-called "ephemeral" port number from a range of available port numbers. This ephemeral port number is included as the source port number in outgoing packets for the mobile node, and as the destination port number in incoming packets destined for that mobile node. The NAT maintains a mapping between external IP addresses and port numbers on the one hand and private IP addresses and port numbers on the other. The NAT performs IP address and port number translation for incoming packets using this mapping. IP address and port number translation is also performed by the NAT for outgoing packets based upon this mapping.

A problem with NATing is that, as a mobile device does not have a permanently allocated external IP address and port number, it is generally not possible for an external device to initiate a communication session with the mobile device. The external IP address and port number mapped to a particular mobile node may even change between different PDP context creations. The NAT must reject all such externally initiated communications to avoid the risk of them being forwarded to the wrong mobile device. In some cases it may be possible for a mobile device to initiate and establish a connection with an intermediary server via the NAT, and to maintain that connection by regularly polling the server. An external peer device may then initiate a connection with the mobile device by routing a connection request via the intermediary node and through the already open "pinhole" in the NAT. This of course requires that an appropriate application be installed in the mobile device (and in the external peer device), and that signalling be exchanged between the mobile device and the intermediary server hosting the registration service each time the device is allocated a new external IP address and port number (in addition to the polling traffic).

US2010/0094978 describes a mechanism for interfacing a private network to a public network such as the Internet. This involves providing a node or nodes in the public network with a host identifier having a first part identifying a server agent interfacing the two networks and a second part identifying a server present in the local network. Using the first part of the host identifier, a node in the public network is able to obtain an IP address for the server agent (e.g. using a DNS lookup) and open a TCP connection to the server agent. The public network node then forwards a message, destined for the private network server, to the server agent. This message includes in it the relevant host identifier. The server agent listens to a well known port, e.g. 80, and receives connection requests on that port. The server agent uses the second part of the host identifier to forward the received message to the private network server. This approach is limited to those protocols such as HTTP which allow the hostname to be included within the message sent from the public network node to the private network server. It is not applicable to protocols that do not allow this such as SNMP, SSH, SMTP, LDAP as well as other proprietary protocols that run over IP.

The problems presented by approaches such as US2010/0094978 are addressed by WO2012/103938 which proposes allocating a private network IP address, a hostname (e.g. imsi_x.oper.com) and a service name (e.g. service_x_.tcp.imsi_x.oper.com) to a first node (e.g. being a mobile terminal associated with a particular International Mobile Subscriber Identity, IMSI) within a private network, the service name being associated with a service provided by the first node. At a gateway interconnecting the private network with a public IP network, a unique public network side port number is allocated to the first node. A mapping between the private network IP address (and optionally the private network side port number) and the public network side port is included in a connection table. The following records are installed in a Domain Name System, DNS, of the public IP network:
  a service, SRV, record defining the service name, hostname and public network side port number as the location for the service name, and
  an address, A, record defining a public IP address of the gateway as the location for the hostname.

A second node or "application", attached to the public network but outside of the private network, is thereafter able to perform a DNS lookup in the public IP network in order to resolve the service name into a public IP address and port number. The gateway listens at the public side network port number for connection attempts to the first node, performs address and port translation on incoming requests using the mapping, and forwards the requests to the first node.

FIG. 1 illustrates schematically the approach described in WO2012/103938 and which involves the introduction of a new node defined as an Mobile Device Service Internetifier (MDSI). The MDSI uses information provided by the GGSN that is triggered by a PDP context creation. The information is sent using the Radius protocol and includes inter alia the MSISDN, IMSI, IMEI and the assigned private IP-address of the mobile server. Furthermore, the MDSI uses information that has been pre-provisioned in it, including the service(s) name and local port(s) that is provided by the mobile device.

In summary, WO2012/103938 enables two-way communication between a (m2m) device located in internal network and an application located in an external network. Any request received by the gateway from an external application will be forwarded automatically to the device, i.e. transparently, using the private IP address and private port number via port mapping in the gateway. This gateway is transparent and able to forward any two-way communication traffic in any protocol based on TCP/UDP between the external application and the internal device.

The approach described in WO2012/103938 does not, by itself, allow an external application to explicitly address and access multiple service instances (i.e. resources) with the same service protocol name on the device, e.g. the external application cannot directly access multiple HTTP or CoAP service instances (resources) that are defined on different resource URI paths with the same service protocol (HTTP/CoAP) and service port number, and with the same IP address (same device).

Consider for example a logistics company operating a fleet of delivery trucks. Each truck may be provided with an m2m device that is attached to a Public Land Mobile Network PLMN. The PLMN performs NATing on upstream and downstream packet traffic to allow a large number of m2m devices to share a relatively small pool of public IP addresses. Each truck is further provided with a number of sensors ("resources"), e.g. including a container temperature sensor, camera, etc. These resources are coupled to the m2m device, for example via a local WiFi network or using Bluetooth™. Via an application provided at the control centre of the logistics company, the company wishes to obtain data from each of the resources across its fleet of trucks.

WO2012/103938 provides only for direct addressing of m2m devices via service protocol, IP address, and port number. Such addressing, via a unique DNS registered device hostname (for example based on the m2m device's IMSI and which links the SRV records to the A records) is a coarse and inconvenient method and in particular does not allow developers of m2m applications to distinguish between different APIs exposed by the device. Furthermore, the mapping provided by the prior art approach limits both the amount of services that can be exposed behind a given public IP address (to the total number of ports—65535) and the flexibility with which new services can be introduced (due to the need for manual configuration of the mapping). An m2m device may act as an aggregator of multiple resources which are identified by different resource URIs and need to be addressed and accessed individually by an application. The mechanisms presented in WO2012/103938 require the application to know everything about the device and the resources exposed by it, e.g. what is the correct resource URI path on the device to address and access, and the application must use exactly the same service protocol and request format as the device uses in order for the device to understand and parse the request correctly. Commonly used applications do not know so much about the device or the services they access.

SUMMARY

According to a first aspect of the present invention there is provided apparatus for operating as a server node within a private IP network to host or aggregate a plurality of resources. The apparatus comprises an address controller for obtaining a private IP network IP address, for allocating a server node port number to said resources, and for causing the server node to listen on that server node port. A resource configurator is provided for determining for each of said resources a resource private Uniform Resource Identifier, URI, or URI path together with resource metadata, and for sending to a gateway, interconnecting the private IP network with a public IP network, an advertisement containing said private URI or URI path and respective resource metadata. The apparatus further comprises a resource request receiver for receiving requests at said server node port, for identifying private URIs or URI paths included within the requests, and for delivering resources corresponding to said URI or URI paths.

Embodiments of the invention may allow individual server nodes, within private networks, to make multiple resources available to external applications, i.e. applications outside of the private network, in such a way that detailed URIs or URI paths need not be known a priori to the external applications. This simplifies the process of developing those external applications.

The apparatus may comprise an interface or interfaces for communicating with one or more sub-nodes, which sub-nodes are responsible for hosting said resources, said resource request receiver being configured to forward received requests to the appropriate sub-node. These sub-nodes may be considered "child" nodes or "embedded" nodes.

Where the private IP network is a Public Land Mobile Network, PLMN, the apparatus may further comprise a radio unit for communicating with the PLMN. Such a configuration allows installation of the server node on a vehicle, plane, or aeroplane.

The resource configurator may be configured to determine metadata including one or more of enterprise controlled alias names, a resource UUID, a resource name or ID, a device serial number, product type, model number, device type, geographical location of the resource/device, owner/user of the resource/device.

The apparatus may comprise a message wrapper and unwrapper for wrapping a protocol specific message including resource metadata into a generic message format including a resource URI or URI path for inclusion in said advertisement, and for unwrapping a generic message format including a resource URI or URI path, contained within a received request, to determine a protocol specific message.

According to a second aspect of the present invention there is provided a transport mode, such as a vehicle, train or aeroplane, comprising the apparatus of the above first aspect of the invention.

According to a third aspect of the present invention there is provided apparatus for hosting an external application capable of accessing a resource hosted or aggregated by a server node attached to a private IP network. The apparatus comprises a memory for storing a Uniform Resource Name, URN, and metadata concerning said resource, and a resolver for communicating with a DDDS/DNS server or servers in order to resolve said URN into a public IP address and port number and one or more SRV+TXT records, where the TXT field of the or each record contains metadata associated with a resource hosted or aggregated by said server node and a resource Uniform Resource Identifier, URI, or URI path. The apparatus further comprises a processor for selecting an SRV+TXT record by matching the metadata stored in said memory to metadata contained in the TXT field(s), and a resource requester for sending a resource request to said public IP address and port number and including the resource URI or URI path contained in the selected SRV+TXT record.

According to a fourth aspect of the present invention there is provided a gateway for interconnecting a private IP network and a public IP network in order to facilitate external access to a plurality of resources hosted or aggregated by a server node attached to the private IP network. The gateway comprises a first address controller for obtaining a private IP network IP address and port number allocated to said server node, a second address and port controller for allocating a public IP network IP address and public network side port number to said server node, and for causing the gateway to listen on the allocated public network side port number, and a database and database controller for maintaining at the gateway a mapping between the private side IP address and port number and the public side port number.

The apparatus further comprises a receiver for receiving at the gateway from the server node, an advertisement of respective resource private Uniform Resource Identifier, URI, paths together with respective resource metadata, and a registrar for registering
  a) said public side IP address and port number, and
  b) said private URI paths, or said public URI paths mapped to the private URI paths, and respective resource metadata
as resource records in a public network Dynamic Delegation Discovery System, DDDS, and Domain Name System, DNS, to allow Uniform Resource Name, URN, based queries to be resolved into public or private URI paths using DDDS and DNS lookup based upon resource metadata.

The apparatus further comprises a request handler for,
  receiving access requests, destined for said public side IP address and port number, and containing one of said public or private URI paths,
  mapping, for each request, the public side port number to the corresponding private side IP address and port number, and, if required, for mapping the contained public URI path to a private URI path, and
  forwarding the connection request to said server node.

According to a fifth aspect of the present invention there is provided a gateway for interconnecting a private IP network and a public IP network in order to facilitate external access to a plurality of resources hosted or aggregated by a server node attached to the private IP network. The gateway comprises an address and port controller for allocating a public IP network IP address and public network side port number to said server node, and for causing the gateway to listen on the allocated public network side port number, and a receiver for receiving at the gateway from the server node, an advertisement of respective resource private Uniform Resource Identifiers, URIs, together with respective resource metadata. The apparatus further comprises a database and database controller for maintaining at the gateway a mapping between the private URIs and respective public URIs, and a registrar for registering
  a) said public side IP address and port number, and
  b) said public URIs and respective resource metadata
as resource records in a public network Dynamic Delegation Discovery System, DDDS, and Domain Name System, DNS, to allow Uniform Resource Name, URN, based queries to be resolved into public URIs using DDDS and DNS lookup based upon resource metadata.

The apparatus further comprises a request handler for,
  receiving resource level requests, destined for said public side IP address and port number, and containing one of said public URIs,
  mapping, for each request, the public URI to the corresponding private URI,
  generating a new resource level request including the mapped private URI, and
  forwarding the new resource level requests to said server node.

Further aspects of the invention, including aspects relating to method of operating network nodes, and set out in the appended claims.

BRIEF DESCRIPTION OF THE DRAWINGS

FIG. 6 illustrates an exemplary set of SRV+TXT records;

FIG. 7 illustrates an exemplary set of DDDS NAPTR records;

DETAILED DESCRIPTION

As will be appreciated by the person of skill in the art, the conventional approach to NATing requires the maintenance within the NAT of a table mapping private IP addresses on the one hand with public IPv4 addresses and ephemeral port numbers on the other. Due to the relatively low numbers of public IPv4 addresses and ephemeral port numbers available to the NAT, the NAT will seek to reallocate unused public IPv4 address and ephemeral port number combinations. This makes it difficult to establish connections between a device located in a private network behind the NAT and an external device coupled to a public network such as the Internet, where it is the external device that initiates the connection. In such a scenario, the external device operates as the client, whilst it is the mobile device behind the NAT that operates as the server. Known solutions addressing this problem do not allow an external application to easily and flexibly access multiple resources available behind specific private network (m2m) devices.

A number of abbreviations will be used in the following discussion and are listed here for ease of reference:
m2m: Machine-to-machine
APN: Access Point Name
CUDB: Central User Database
EP: enterprise
DNS: Domain Name System
DDDS: Dynamic Delegation Discovery System
DAE: Device Access Enabler
SRV: DNS Service Record
TXT: DNS Txt record
PTR: DNS PTR record
NAPTR: DNS NAPTR record
IMSI: International Mobile Subscriber Identity
URI: Uniform Resource Identifier
URN: Uniform Resource Name
CoAP: Constrained Application Protocol
SSDP: Simple Service Discovery Protocol
SNMP: Simple Network Management Protocol A new approach to enabling external applications to access multiple resources available behind a private network (m2m) node will now be described. This approach builds upon that described in WO2012/103938 and it may be helpful for the reader to refer to that document. The new approach assumes that multiple resources available behind a private network connected m2m node are represented by respective resource URIs, and that an external application is able to lookup and identify resources in a flexible manner via respective resource identifiers, e.g. URNs. Addressing by URN is a convenient and flexible mechanism and allows application developers to define enterprise controlled "alias" names for enterprise devices/resources.

Figure 1:
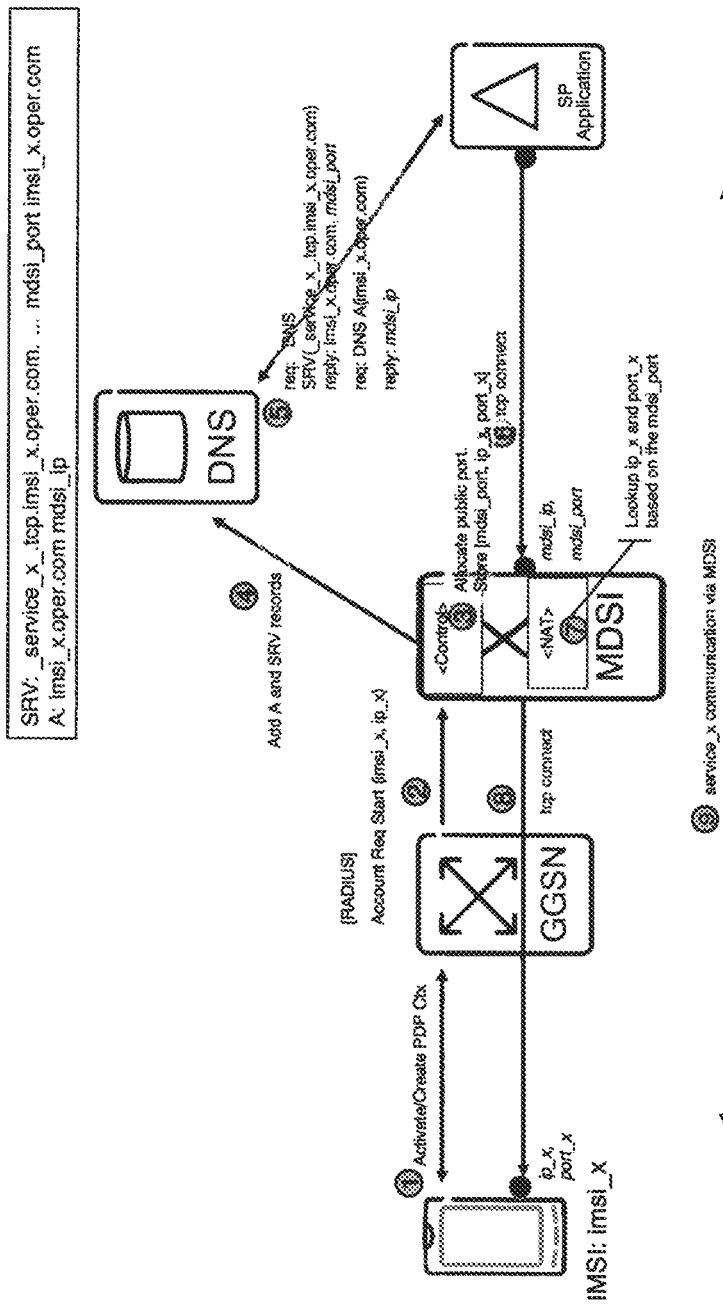
FIG. 1 illustrates schematically a known network architecture for enabling public access to a mobile node within a private network.
Figure 2:
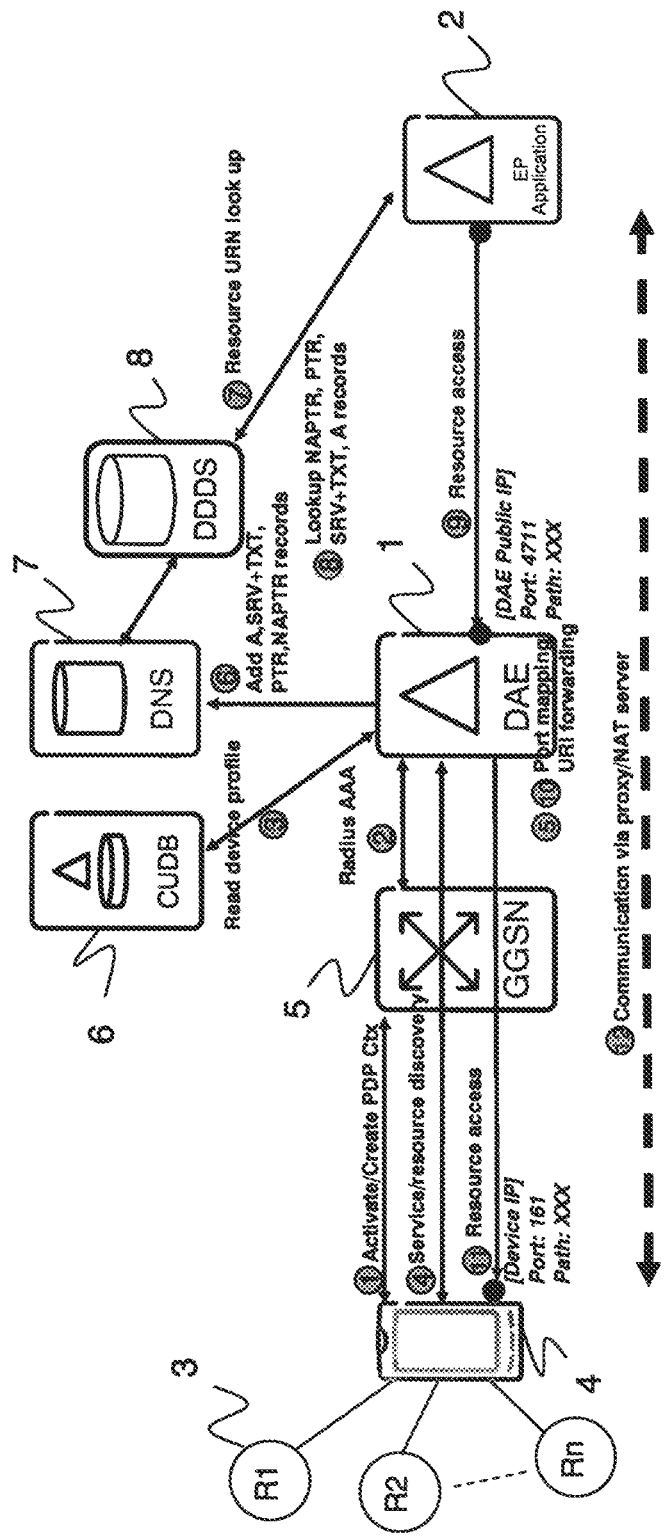
FIG. 2 illustrates schematically a new network architecture for enabling public access to a mobile node within a private network.

FIG. 2 illustrates schematically a network architecture comprising various nodes including a new node referred to here as a "Device Access Enabler" (DAE) 1. The DAE is a specific implementation of a gateway. The gateway may be a single node, as in the case of the DAE, or may comprise functionality distributed over a plurality of nodes. Here, the DAE is key to allowing an Enterprise (EP) application 2 to access multiple resources 3 made available by an m2m device 4 operating as a "server node" within a private network. The device 4 is a mobile terminal (where that term encompasses also so-called "fixed mobile terminals") able to access the services of a PLMN. In particular, the PLMN provides a Packet Switched (PS) access for the device utilising a GGSN 5, with traffic being routed between the GGSN and a public network via the DAE 1. [Other components of the PLMN network are omitted for the simplicity.] Also present within the PLMN is a CUDB 6. FIG. 1 further illustrates a Domain Name System (DNS) 7 and a Dynamic Delegation Discovery System (DDDS) 8 that form parts of the known public network infrastructure.

The key features required to implement the proposed resource access mechanism are as follows:

A resource discovery mechanism in the DAE in order to discover, for the device, resource URIs and available resource/service description metadata, e.g. resource identifiers and/or key attributes.

A resource "wrapper" in the server node which wraps requests and messages into resource URI based ones and vice versa, using generic message schema.

A URI forwarding table in the DAE enabling mapping between public URIs of the DAE and private local URIs of the device.

A first provisioning mechanism in the DAE for provisioning DNS TXT records combined with SRV records in the DNS. These records enable an external application to use the DNS to perform a lookup for resource URIs, using as the lookup query the provisioned metadata.

A second provisioning mechanism in the DAE for provisioning DNS NAPTR records to enable DDDS URN look up (domain delegation and URN rewriting).

Figure 3:
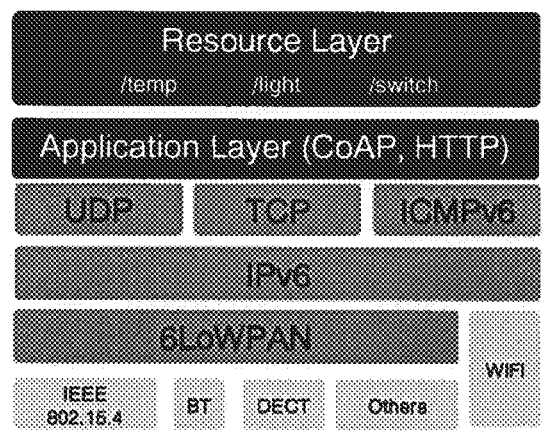
FIG. 3 illustrates schematically protocol layers implemented within an m2m device of the network of FIG. 2.

Considering further the resource wrapper present in the server node (m2m device), FIG. 3 illustrates schematically an example protocol stack and layers present on a m2m device. The topmost layer is a resource layer added into the device layers on top of the application layer protocols, e.g. HTTP, SNMP, etc. The resource layer enables resource discovery, registration, lookup and access as described further below. Besides protocols such as HTTP(s), CoAP, SSDP, SIP etc which already support resource/service URI based resource/service access, the solution presented here is also applicable to protocols and standards that do not support such access, for example SNMP, SMTP, LDAP, FTP, SQL, etc, as well as many other proprietary protocols that run over IP. This is enabled by the resource wrapper, which can "wrap" those non-supporting protocol messages into resource URI based resource requests and vice versa. All protocols that support GET, POST, PUT, DELETE or similar types of commands, or ubiquitous CRUD database operations, can be mapped to resources, e.g. using known procedures to map SNMP commands into REST resources and vice versa.

Figure 4:
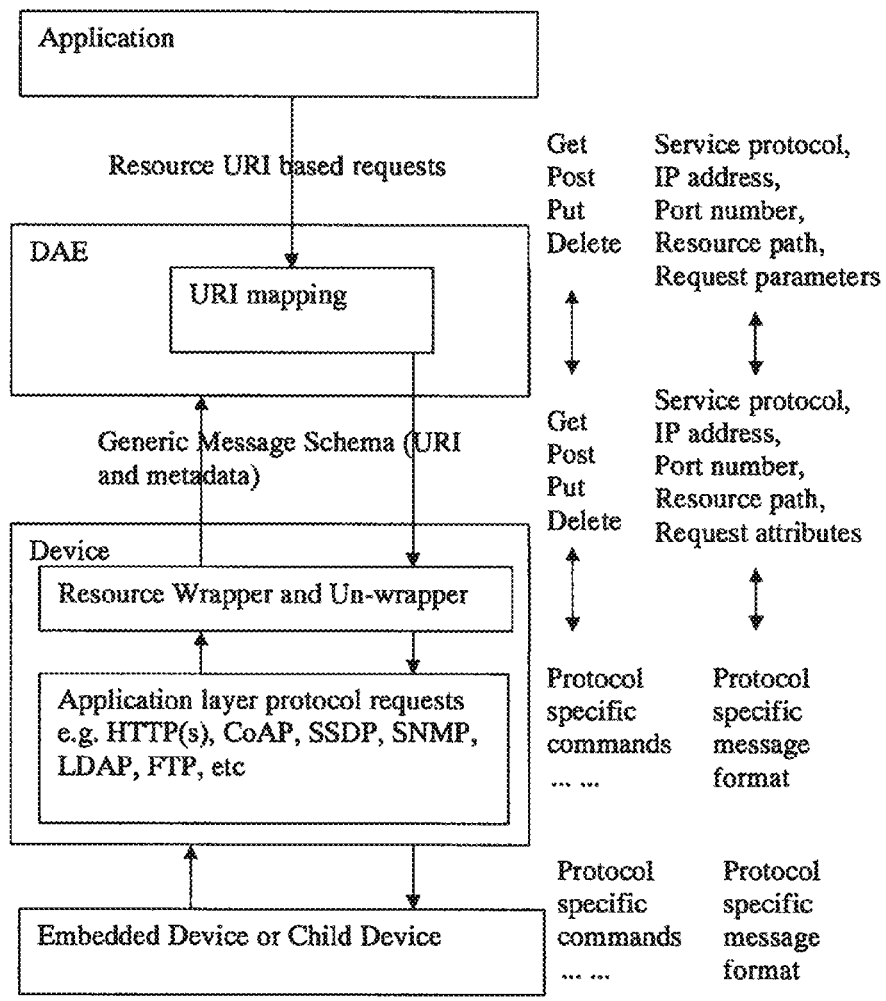
FIG. 4 illustrates a procedure implemented in the network of FIG. 2 and including a wrapping operation carried out at a server node.

The resource wrapper is used in both the resource discovery process and the resource access process. In a resource discovery process, i.e. when the m2m device advertises the available resources, the content of the advertisement message will be mapped to a message format using a generic message schema in order to facilitate the later provisioning process. In a resource access process, i.e. when an external application initiates a resource-URI based request to an m2m device, the request will be mapped into the device protocol specific request format by the resource wrapper (acting here as an "un-wrapper") upon receipt of the request by the m2m device, thereby allowing the device to understand the protocol specific request. [When the m2m device initiates communication with the external application, the device protocol specific request will be mapped into the resource URI based request using the generic message schema, and then sent to the DAE.] The wrapping and unwrapping processes are illustrated further in FIG. 4.

Figure 5:
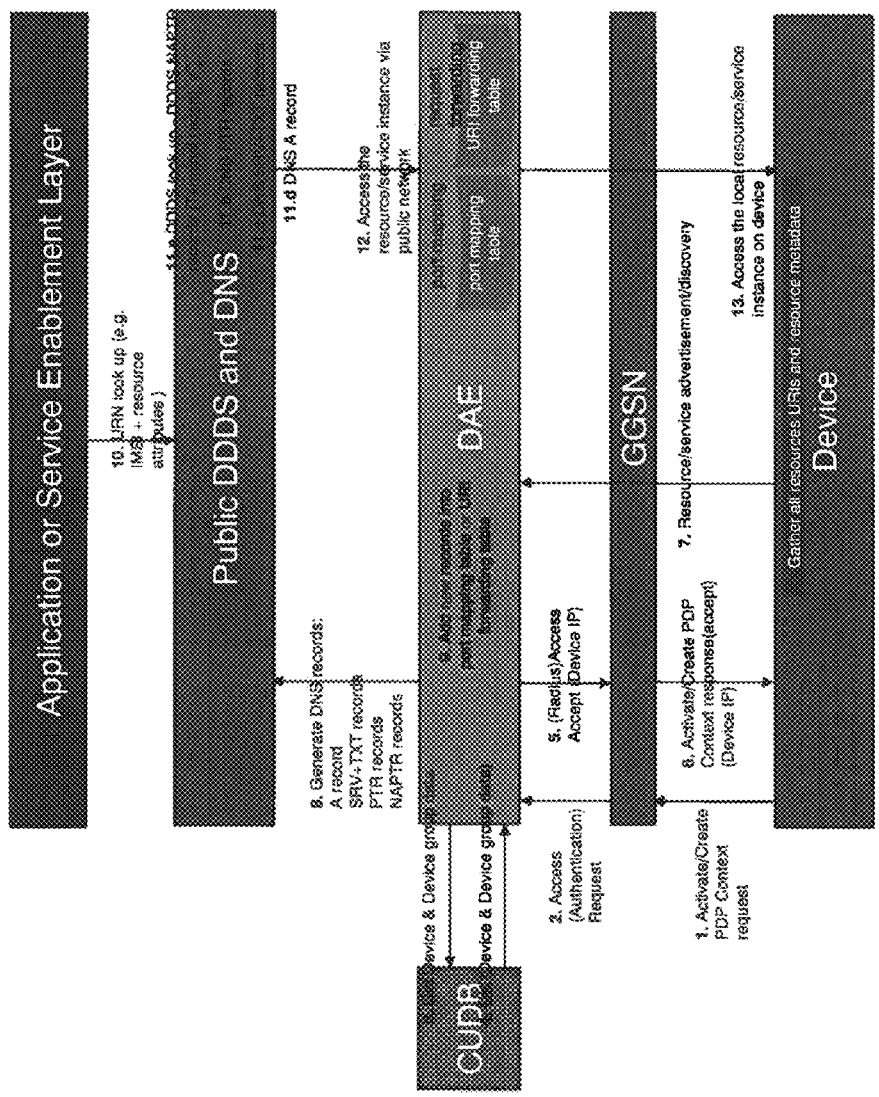
FIG. 5 illustrates schematically various entities present within the architecture of FIG. 2 and related signalling procedures.

FIG. 5 provides an alternative representation of the general architecture and procedures of FIG. 2, including a series of numbered procedural steps. These steps will now be considered further, assuming that requests to be sent by the external application are application layer requests, e.g. HTTP. [An alternative scenario involving the sending of resource layer requests will be considered subsequently.]

[Steps 1 to 6]: The m2m device powers on, and the PLMN authenticates the device using for example the APN and IMSI. The device acquires a private network IP address from the DAE and GGSN (analogous to the procedures described in WO2012/103938.

[Step 7]: The m2m device gathers metadata from the underlying/embedded devices and resources and advertises the resources to the DAE. This metadata is descriptive of, i.e. can be used to identify and/or address and/or describe, the underlying/embedded devices and resources. [The m2m device will send a multicast or unicast advertisement message containing the metadata towards the DAE (e.g. SSDP advertisement messages or CoAP multicast messages), with the GGSN forwarding the message to the DAE.] Metadata may include, for example, enterprise controlled alias names, e.g. a resource type, or a resource UUID, or a resource name or ID, a device serial number, product type, model number, device type, geographical location of the resource/device, owner/user of the resource/device, etc. Some of the resource metadata, e.g. geographical location, device subscriber, etc, can be directly acquired from an access network such as a PLMN, and automatically provisioned into the system.

[Step 7.1] A "resource wrapper" is used on the m2m device to map the protocol specific advertisement message to a resource URI based one, using a generic message schema that is abstracted from different device protocols used to advertise the resources. The DAE should listen to all ports that different devices may send advertisement messages to. The generic message schema has the URI format Protocol://device private IP:port/path and contains:

[Destination IP address and port]: e.g. DAE Public IP: special port for provisioning, e.g. 5683 in case of CoAP, 1900 in case of SSDP, 80 or 8080 etc in case of HTTP, etc

[Source IP address and port]: Device Local IP: local port

[Service request protocol]: protocol is e.g. CoAP, SSDP, HTTP, etc

[URI path and AVPs]: These have the format:
path=/../../..; attribute1="value"; attribute2="value"; attribute3="value", e.g. path=/sensors/temp; resourcetype="temperatureSensor"; unit="C"; location="mexicocity", Each message must have a URI path that is used to locate the resource/service. Additionally it may have an unlimited number of AVPs containing resource metadata. Attribute Value Pairs have the format [attribute="value"] and are generic for any protocol message format and any format of data.

"Path" should be the additional resource path besides the IP address and port number, i.e. the relative resource "path" excluding the protocol name, IP address and port number. Each resource is represented by an individual line in the URI path and resource metadata field from the message schema, and it will be provisioned into DNS records and mapping table in later steps.

Consider for example a m2m device sending a CoAP device discovery advertisement message to the DAE and that identifies two resources made available via the m2m device (a temperature sensor and a light sensor). The resource wrapper processes the message to generate:
path=/sensors/temp;
    resourcetype="temperatureSensor"; unit="C";
location="mexicocity",
path=/sensors/light; resourcetype="LightLux", Considering an SSDP device discovery advertisement message (being sent by an m2m device making available three resources, namely a "deviceDescription", a remote control receiver, and a Samsung™ Digital Media Receiver (DMR). The resource wrapper would process this message to generate:
path=/deviceDescription/c40a518f-6e4b-3d4a-b2ea-f39bd2e8b629; resourcetype="MediaRenderer"; version=1,
path=/rcr/RemoteControlReceiver.xml;
    resourcetype="rootdevice"; uuid="55221034-bbc0-ccb8-0855-509e4f8a91ca",
path=/dmr/SamsungMRDesc.xml;
    resourcetype="MediaRenderer"

[Step 8]: The DAE receives the resource advertisement message from the m2m device and provisions records in the DDDS and DNS servers. These procedures can be broken down as follows:

[Step 8.1] Generate a DNS A record mapping an m2m device hostname to a public IP address of the DAE, e.g. imsi_x.oper.com: DAE public IP.

[Step 8.2] Generate a DNS SRV+TXT record for each resource being made available by the m2m device, using the content of the advertisement message. The SRV field of each record follows the standard format. The TXT field of each record includes: the resource URI path, e.g. path=/sensors/temp, and resource metadata to help (external applications) identify and access the corresponding resource. FIG. 6 illustrates three exemplary SRV+TXT records assuming that each of the associated resources have an "http" service type and that the m2m device hostname is "imsi_x.oper.com".

[Step 8.3] Generate PTR records, for example having the format:
_path_x_service_x_tcp.imsi_x.oper.com
PTR records are used to map service type names to specific resources, enabling the retrieval of the list of all resources of a given service type. For example, if the service type is "https", three PTR records might be provided as follows:
_https._tcp.imsi_x.oper.com    PTR_/sensor/temp_https_tcp.imsi_x.oper.com
_https._tcp.imsi_x.oper.com    PTR_/sensors/light_https_tcp.imsi_x.oper.com
_https._tcp.imsi_x.oper.com PTR
_/rcr/RemoteControlReceiver.xml_https_tcp.imsi_x.oper.com

[Step 8.4] Generate DDDS NAPTR records and terminal "s" record. A DDDS URN lookup will perform a lookup, in a stepwise manner, for the URN root domain and for one or more sub-domains, e.g. MVNO domain, MNO domain, and then finally enter into the DNS domain where the terminal NAPTR "s" record exists (the s record containing the matched IMSI number and input for the next SRV+TXT record lookup). FIG. 7 illustrates a number of possible s records associated with respective different services, e.g. https, http, coap, etc.

[Step 9]: If the resource "Path" is the same on the devices and is valid for local resource access on devices, "Port forwarding" can be used at the DAE. Port forwarding will automatically forward any application request, received by the DAE from the external network, to the local private IP address and port number of the m2m device. This is essentially as described in WO2012/103938. If the application request contains a path, the path will also be forwarded to device port as a request line parameter.

In some cases the URI path on the device may be different from the public URI path registered by the gateway in the DNS. This situation may arise, for example, when a m2m device is pre-configured by a manufacturer with one or more private URI paths. For example, a private URI path for a sensor may be /measurement. When the device is brought into use, it may advertise an alternative, public URI to the gateway, e.g. /Temperature/Stockholm/Sensor101. In this case "Port forwarding" alone is insufficient, and the DAE must create a "URI forwarding table" storing the URI mapping relationships between the public URIs and the private resource URIs. Requests received by the DAE and directed to the public URI will be forwarded to the private resource URI.

[Step 10]: External application initiates a URN lookup. The advantage of using a URN as opposed to a URI is that the URN is location independent which means that the resource naming can be much more flexible, and a resource name should not change when the resource location is changed. It is assumed here that the resource URN could contain, for example, a hashed IMSI (e.g. generated using the MD5 hashing function), a 3GPP external identifier, and/or any resource identifier, or any resource metadata attribute) that can help identify the resource on the device. Example URNs are:
m2m:temperatureSensor@imsi_x.oper.com
urn:m2m:oper.com:imsi_x:temperatureSensor
urn:m2m:smartmeter_x:imsi_x@oper.com (e.g. 3GPP external identifier can be mapped to IMSI number by 3GPP MTC-IWF Machine-Type-Communication Interworking Function)
https://imsi_x.oper.com/temperature?location=mexicocity

[Step 11]: DDDS and DNS lookup. A combined DDDS and DNS lookup is used in order to resolve the resource URN request submitted by the external application (wishing to access the resource). The procedure may be as follows:
(DDDS Server) First Well Known Rule: e.g.
"m2m.urn.arpa" (input for next lookup)
"epc.urn.arpa"
"foo.urn.arpa"
"cid.uri.arpa"
(DDDS Server) NAPTR Record:
"oper.com" (input for next lookup)
"oper2.com"
"oper3.com"
(DDDS Server) NAPTR Record:
"oper.dcp.com" (input for next lookup)
In this example, the input domain name "oper.com" delegates the URN lookup to the new domain name "oper.dcp.com" which is hosted by the DNS (DDDS) created according to the approach described above. The DNS (DDDS) system acts as the resource resolver and receives the terminal DDDS lookup. It returns to the inquiring (external) application the terminal NAPTR "s" records matched to the IMSI number, and points to the next SRV records for the next DNS SRV lookup.
(DDDS Server) NAPTR "s" Terminal Records (for Next Looking Up SRV Records): e.g.
"_https_tcp_imsi_x.oper.com" (input for SRV lookup)
"_http_tcp_imsi_x.oper.com"
"_coap_udp_imsi_x.oper.com"
"_snmp_udp_imsi_x.oper.com"
"ldap_tcp_imsi_x.oper.com"
"_ftp_tcp_imsi_x.oper.com"
(DNS Server) PTR Records There are multiple resources under the same service type, e.g. there are many resources with different resource paths under "https" service type, here we need another DNS record "PTR" to facilitate the following lookup, and it uses different resource paths to identify different resources under the same service type: e.g.
"_[path1]._https._tcp.imsi_x.oper.com"
"_[path2]._https._tcp.imsi_x.oper.com"
"_[path3]._https._tcp.imsi_x.oper.com"
(DNS Server) SRV+TXT Records (Match Resource Metadata Attribute with TXT Records):

Each PTR record will map to a single SRV+TXT record. The DNS server returns the identified set of SRV+TXT records to the querying external application. For each SRV+TXT record received by the external application, the TXT record is inspected to determine if a match exists for the resource metadata. Considering for example the SRV+TXT records of FIG. 6, the application might determine that its search criteria match the first record based upon the inclusion in that record's TXT field of the metadata "resourcetype=temperatureSensor" and "location=mexicocity". [Matching may be carried out, for example, using standard keyword matching or semantic matching (e.g. using the Lucene search engine library).] This record selection finally resolves the application requested URN to the resource URI. The external application then obtains the A record from the DNS in order to map the m2m device hostname to the DAE public address.

[Step 12]: The External Application can Now Initiate any Request on the Public URI:
Protocol://dae public IP: port/path
e.g. https://dae public IP:53879/sensor/temp

Figure 8:
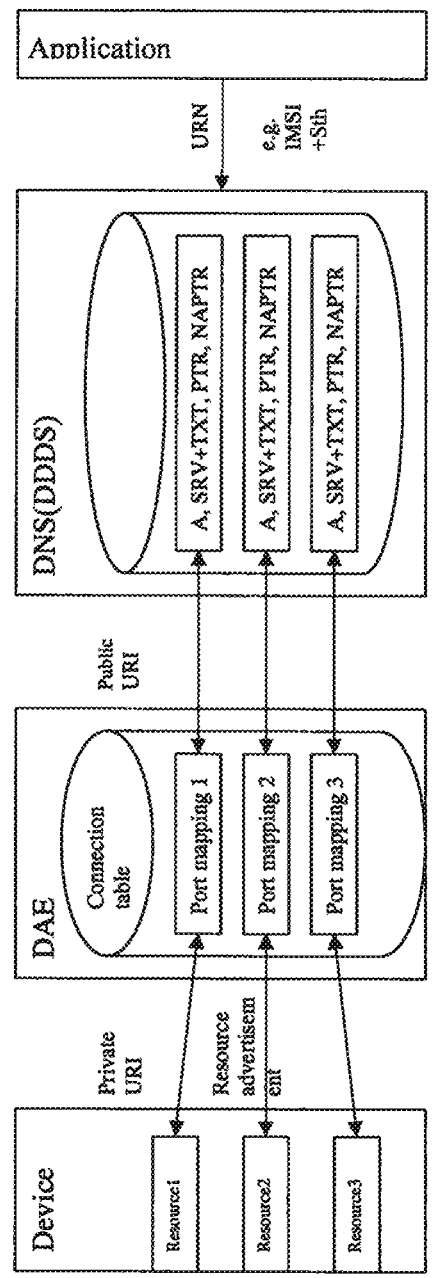
FIG. 8 illustrates schematically various entities present within the architecture of FIG. 2 when implementing transparent IP address and port forwarding at a gateway (DAE)
Figure 9:
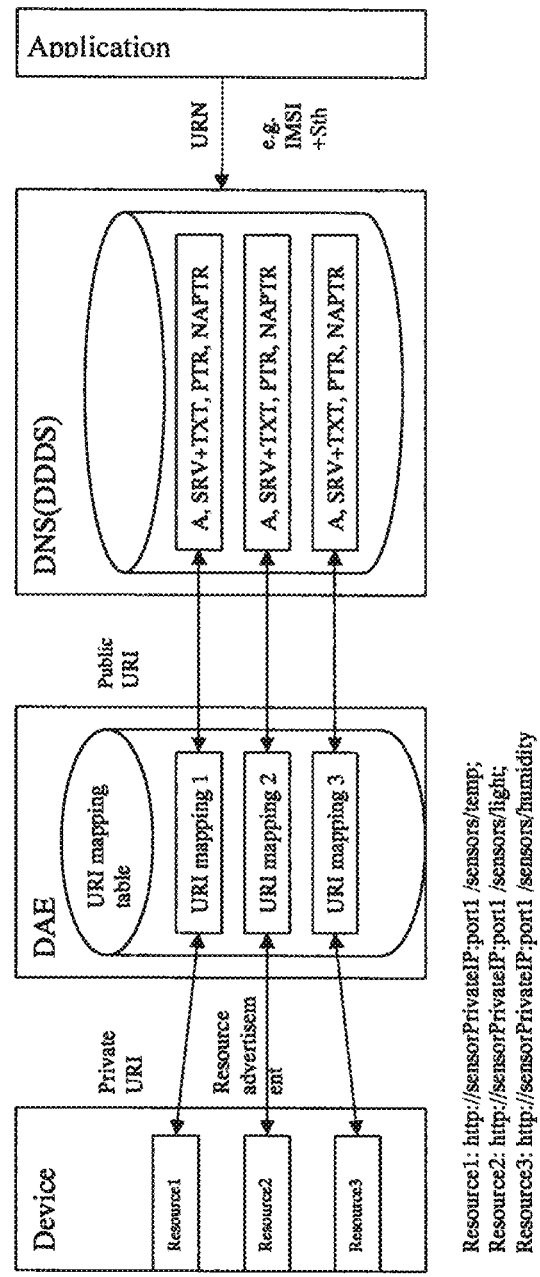
FIG. 9 illustrates schematically various entities present within the architecture of FIG. 2 when implementing transparent URL mapping at a gateway (DAE)

[Step 13]: Any resource request sent to the public resource URI is port mapped and possibly URI path mapped (if the resource "path" is invalid on the devices and thus requires mapping to a local "path") by the DAE. FIG. 8 illustrates schematically the overall approach when port forwarding is employed, whilst FIG. 9 illustrates schematically the overall approach when port mapping and URI path mapping is employed.

Considering further the case where the public and private URI paths are the same, as already noted, port forwarding alone is required at the gateway. If for example, the external application sends an HTTP GET request to the gateway:
GET/Temperature/Stockholm/Sensor101 HTTP/1.1
Host: 10.10.100.101:80
After Gateway Port mapping: 80→192.168.1.101:8002, the request will be forwarded to the device as:
GET/Temperature/Stockholm/Sensor101 HTTP/1.1
Host: 192.168.1.101:8002

In the case that the public and private URI paths are different, i.e. the public URI path is /Temperature/Stockholm/Sensor101 and the private URI path is /measurement, both port forwarding and URI path mapping are performed at the gateway and the request will be forwarded to the device as:
GET/measurement HTTP/1.1
Host: 192.168.1.101:8002

It will be clear from the above description that local resources made available by the m2m device can be addressed and accessed by applications directly, without requiring a priori that the application know everything about the m2m device. Resources that can be accessed using the m2m device include, but are not limited to, information and data about the device or generated by the device. This includes, for example, measurement data (e.g. sensor data), events, alarms, commands, notifications, pushed data, device configuration and diagnostics, fault and performance reports, firmware and software updates.

Figure 10:
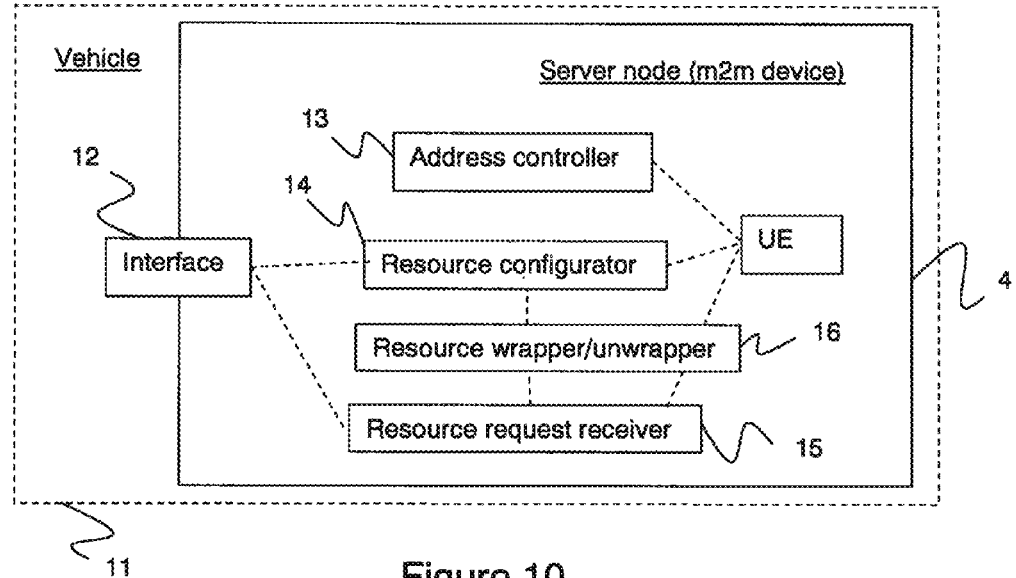
FIG. 10 illustrates schematically a server node within the architecture of FIG. 2.

FIG. 10 illustrates schematically an apparatus configured to operate as a server node within a private IP network to host or aggregate a plurality of resources. The apparatus comprises appropriate computer hardware including processors, code and data memory, interfaces and interface controllers. The hardware is configured, by means of program code stored in the memory, to implement certain apparatus functions. By way of illustration, the apparatus may be an m2m device 4 comprising a User Equipment (UE) 10 function for communicating with a PLMN. The device 4 may be a mobile device, e.g. fitted to a vehicle 11, or may be a fixed mobile terminal. As illustrates in FIG. 2, the m2m device 4 may comprise one or more interfaces 12, e.g. UPnP, for communicating with child nodes providing respective resources (services).

The device comprises an address controller 13 for obtaining a private IP network IP address from the PLMN, for allocating a server node port number to the available (local) resources, and for causing the server node to listen on that server node port. The apparatus comprises a resource configurator 14 for determining for each of the available resources a resource private URI path together with resource metadata, and for sending to a gateway (DAE), interconnecting the private IP network to a public IP network, an advertisement containing the private URI paths and respective resource metadata. The apparatus also comprises a resource request receiver 15 for receiving requests at the server node port, for identifying private URI paths included within the requests, and for delivering resources corresponding to the URI paths. The apparatus also comprises a resource wrapper/unwrapper 16.

Figure 11:
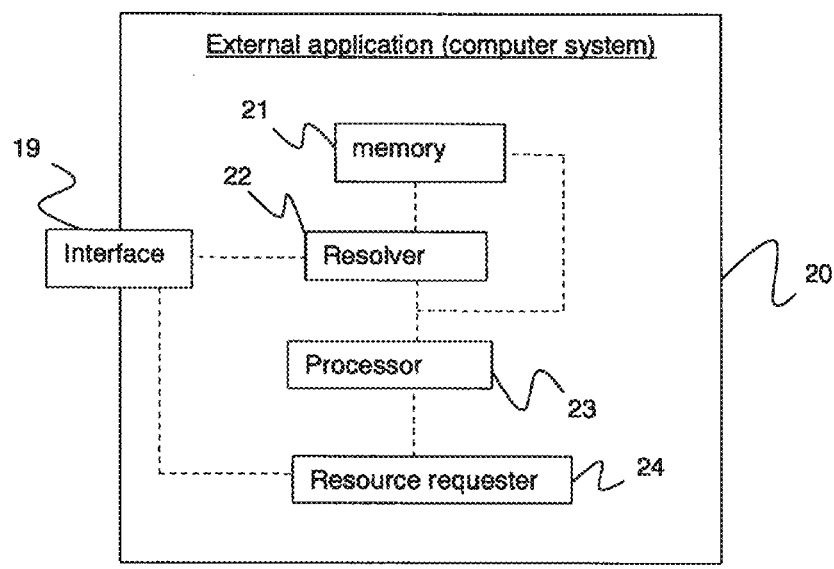
FIG. 11 illustrates schematically an external application within the architecture of FIG. 2.

Referring now to FIG. 11, this Figure illustrates schematically an apparatus 20 for hosting an external application capable of accessing a resource hosted or aggregated by a server node (FIG. 10) attached to a private IP network. As with the m2m device, the apparatus comprises appropriate computer hardware including processors, code and data memory, interfaces and interface controllers. The hardware is configured, by means of program code stored in the memory, to implement certain apparatus functions. The apparatus may be, for example, a computer system installed in a corporate network and having access to the Internet, via an interface 19. The apparatus could also be a mobile device.

The apparatus comprises a memory 21 for storing a URN and metadata concerning the m2m device resource that the apparatus wishes to access. This data may be received via a user interface from a user wishing to access the resource, or could be pre-programmed. The apparatus further comprises a resolver 22 for communicating with a DDDS/DNS server or servers in order to resolve a Uniform Resource Name, URN, into a public IP address and port number and one or more SRV+TXT records. [The TXT field of the SRV+TXT records contains metadata associated with a resource hosted or aggregated by the server node and a resource Uniform Resource Identifier, URI, path. The apparatus comprises a processor 23 for selecting an SRV+TXT record by matching the metadata stored in the memory to metadata contained in the TXT field(s), and a resource requester 24 for sending a resource request to the public IP address and port number and including the resource URI path contained in the selected SRV+TXT record.

Figure 12:
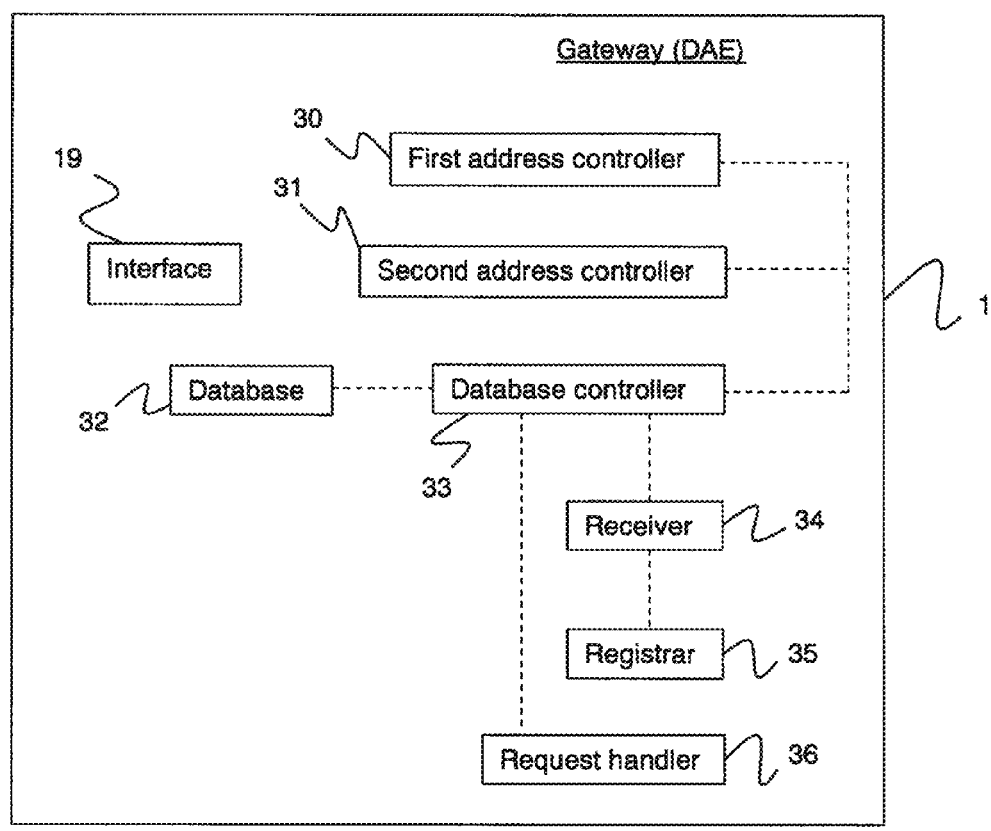
FIG. 12 illustrates schematically a gateway (DAE) within the architecture of FIG. 2.

FIG. 12 illustrates schematically a gateway for interconnecting a private IP network and a public IP network in order to facilitate external access to a plurality of resources hosted or aggregated by a server node attached to the private IP network. Again, the gateway may comprise appropriate computer hardware including processors, code and data memory, interfaces and interface controllers. The hardware is configured, by means of program code stored in the memory, to implement certain apparatus functions. The gateway corresponds to the DAE 1 illustrated in FIG. 1. As will be apparent from the discussion above, the private IP network may be implemented over a PLMN, whilst the public IP network may be the Internet. Although not a requirement, it is likely that, in this scenario, the gateway will be implemented as a node within the PLMN, for example with an interface to the GGSN.

The gateway comprises a first address controller 30 for obtaining a private IP network IP address and port number allocated to the server node (m2m device). It also comprises a second address controller 31 for allocating a public IP network IP address and public network side port number to the server node, and for causing the gateway to listen on the allocated public network side port number. The gateway further comprises a database 32 and database controller 33 for maintaining at the gateway a mapping between the private side IP address and port number and the public side port number, as well as a receiver 34 for receiving at the gateway, from the server node, an advertisement of respective resource private Uniform Resource Identifier, URI, paths together with respective resource metadata.

The gateway is provided with a registrar 35 for registering the public side IP address and port number, and the private URI paths or public URI paths mapped to the private URI and respective resource metadata, as resource records in a public network Dynamic Delegation Discovery System, DDDS, and Domain Name System, DNS, to allow Uniform Resource Name, URN, based queries to be resolved into public or private URI paths using DDDS and DNS lookup based upon resource metadata. The gateway comprises a request handler 36 for receiving access requests, destined for the public side IP address and port number, and containing one of the public or private URI paths, mapping, for each request, the public side port number to the corresponding private side IP address and port number, and, if required, for mapping the contained public URI path to a private URI path, and forwarding the connection request to the server node.

Figure 13:
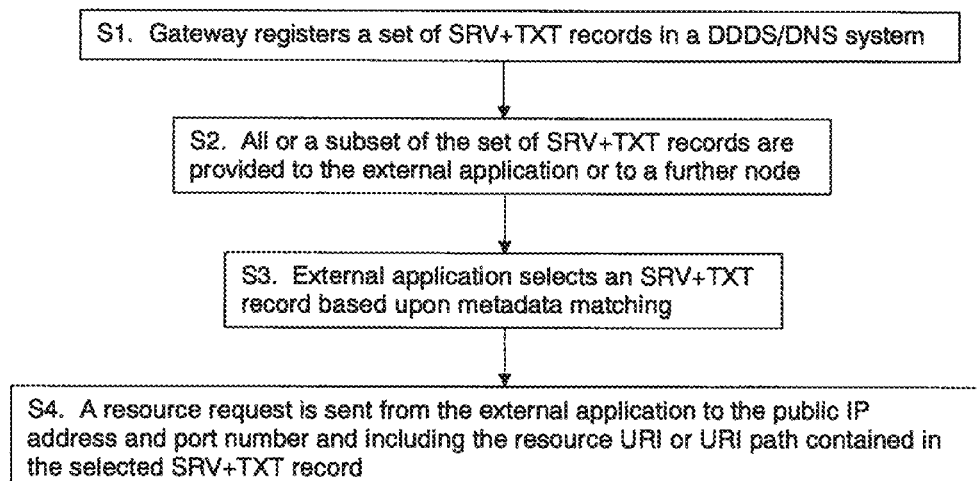
FIG. 13 is a flow diagram illustrating a procedure for allowing an external application to access a resource made available by a server node attached to a private IP network.

Considering now FIG. 13, this Figure illustrates a method of resolving a Uniform Resource Name, URN, into a public IP address and port number and a private Uniform Resource Identifier, URI, path in order to allow an external application to access a resource made available by a server node attached to a private IP network. That server node might be provided by a m2m device. The method comprises firstly registering (S1) a set of SRV+TXT records, mapped to respective resources made available by the server node, in a DDDS/DNS system. Each of these records includes within the TXT field a URI path and metadata of the corresponding resource. All or a subset of the set of SRV+TXT records are provided (S2) to the external application or to a further node, e.g. a node to which the external application delegated a lookup responsibility. An SRV+TXT record is then selected (S3) based upon metadata matching, and a resource request sent (S4) from the external application to the public IP address and port number and including the resource URI path contained in the selected SRV+TXT record.

Figure 14:
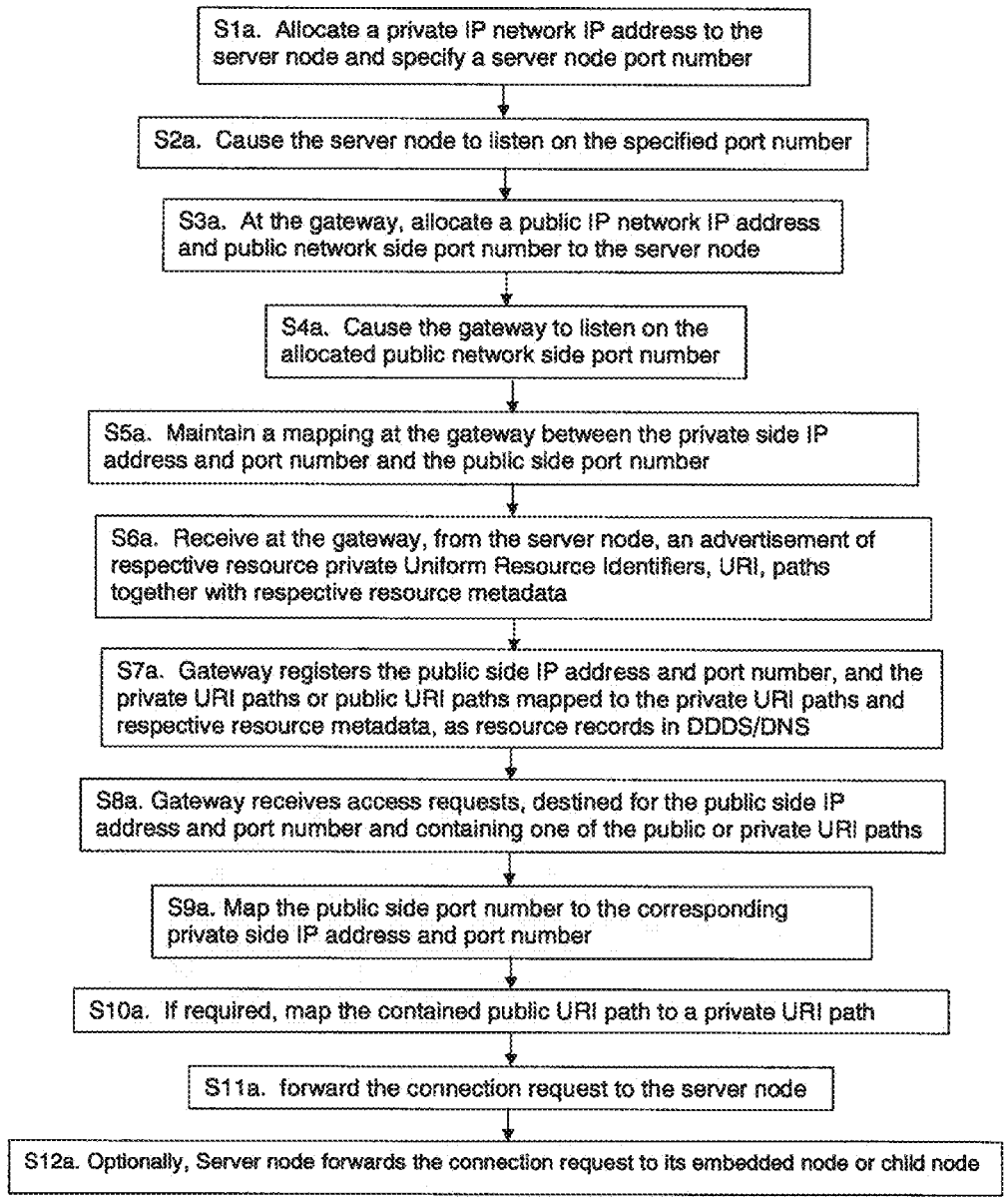
FIG. 14 is a flow diagram illustrating a more detailed procedure for allowing an external application to access a resource made available by a server node attached to a private IP network.

Considering now FIG. 14, this Figure further illustrates a method of facilitating access to a plurality of resources hosted or aggregated by a server node attached to a private IP network, via a gateway interconnecting the private IP network with a public IP network. The method comprises allocating (S1a) a private IP network IP address to the server node and specifying a server node port number, and causing (S2a) the server node to listen on the specified port number. At the gateway, a public IP network IP address and public network side port number are allocated (S3a) to the server node (nb. multiple server nodes may share a common public IP address), and the gateway caused (S4a) to listen on the allocated public network side port number. A mapping is maintained (S5a) at the gateway between the private side IP address and port number and the public side port number.

The gateway receives (S6a) from the server node, an advertisement of respective resource private Uniform Resource Identifiers, URI, paths together with respective resource metadata. This metadata is descriptive, i.e. identifies, the resources that the server node is making available. The gateway then registers (S7a) the public side IP address and port number, and the private URI paths or public URI paths mapped to the private URI paths and respective resource metadata, as resource records in a public network Dynamic Delegation Discovery System, DDDS, and Domain Name System, DNS. These records allow queries containing resource metadata to be resolved into public or private URI paths using DDDS and DNS lookup.

The gateway is subsequently able to receive (S8a) access requests, destined for the public side IP address and port number and containing one of the public or private URI paths, and, for each request, to map (S9a) the public side port number to the corresponding private side IP address and port number. If required, the gateway maps (S10a) the contained public URI path to a private URI path, and forwards (S11a) the connection request to the server node.

The above discussion has been concerned with application layer requests, e.g. HTTP, sent by the external application. An alternative scenario involves the external application sending resource layer requests. The resource layer is a layer that resides above the application layer. An example of a resource layer request is as follows:

URL http://10.10.100.101:80/Temperature/Stockholm/Sensor101
Method GET

The gateway handles this request at the resource layer. Rather than using port and URI mapping, the resource layer generates a new request, using URI mapping. For example, after URI mapping, the following new request is created:

http://192.168.1.101:8002/measurement,
Method GET

This new request message is forwarded to the device: the IP/TCP layers add packet headers in accordance with the destination IP address and port number contained within the URI.

Considering this scenario further, the URI mapping only occurs on the URI resource layer, not on the TCP/UDP/IP layer. The Gateway will look at the URI request, map the URI to the private URI, and form a new URI request to the server node using the new URI. The IP packet layers are not directly involved in this process. Of course, the new IP packet needs to be created and sent to the server node (i.e. a new IP packet is created with a new IP and port number and a new URI path, and is then sent to the server node), but that could be done by a web server (if the web server supports, e.g. the RESTful framework in case of HTTP request). When receiving the application request, the Gateway will not look at the incoming IP packet, it will only look at the resource layer URI request, map the public URI to the private URI, and send the new URI request. Here the Gateway can reuse the existing RESTful framework (for the HTTP case) or use a new RESTful framework (e.g. for SIP/COAP/FTP/SNMP/LDAP/etc case) to be able to send the new URI request to the server node.

This invention is not only applicable to "root" m2m devices, i.e. m2m devices that themselves provide the resources, but is also applicable to the "sub" devices behind a "parent" device. This assumes that the sub devices either register their resources via the parent device or directly to the DAE.

This invention is applicable to devices in a mobile network, but also to devices in a fixed network, WiFi network, Zigbee over IP network, etc.

Steps within the URN resolution procedure may be delegated by the external application to other nodes.

The embodiment described above with reference to the figures includes the possibility of a wrapper/unwrapper implemented at the server node in order to map URI paths and metadata to and from a generic message format. According to an alternative embodiment, this wrapper/unwrapper is implemented at the gateway (DAE). It could also be implemented at a node functionally located between the server node and the gateway.

The invention claimed is:

1. An apparatus for operating as a server node within a private IP network to host or aggregate a plurality of resources, the apparatus comprising:
   an address controller configured to (i) obtain a private IP network IP address, (ii) allocate a server node port number to said resources, and (iii) cause the server node to listen on that server node port;
   a resource configurator configured to (i) determine, for each of said resources, a resource private Uniform Resource Identifier, URI, or URI path together with resource metadata, and (ii) send to a gateway, interconnecting the private IP network with a public IP network, an advertisement containing said private URI or URI path and respective resource metadata; and
   a resource request receiver configured to (i) receive requests, at said server node port, for identifying private URIs or URI paths included within the requests, and (ii) deliver resources corresponding to said URI or URI paths.

2. The apparatus according to claim 1, wherein said advertisement conforms to one or more; HTTP(s), CoAP, SSDP, and SIP protocols.

3. The apparatus according to claim 1, further comprising an interface or interfaces configured to communicate with one or more sub-nodes responsible for hosting said resources, said resource request receiver being configured to forward received requests to the appropriate sub-node.

4. The apparatus according to claim 1, wherein said private IP network is a Public Land Mobile Network, PLMN, the apparatus further comprising a radio unit for communicating with the PLMN.

5. The apparatus according to claim 1, wherein said resource configurator is configured to determine meta including one or more of enterprise controlled alias names, a resource UUID, a resource name or ID, a device serial number, product type, model number, device type, geographical location of the resource/device, and owner/user of the resource/device.

6. The apparatus according to claim 1, further comprising a message wrapper and unwrapper configured to (i) wrap a protocol specific message including resource metadata into a generic message format including a resource URI or URI path for inclusion in said advertisement, and (ii) unwrap a generic message format including a resource URI or URI path, contained within a received request, to determine a protocol specific message.

7. A transport mode comprising the apparatus of claim 1, wherein the transport mode is one of a vehicle, train, and aeroplane.

8. An apparatus for hosting an external application capable of accessing a resource hosted or aggregated by a server node attached to a private IP network, the apparatus comprising:
   a memory configured to store a Uniform Resource Name, URN, and metadata concerning said resource;
   a resolver configured to communicate with a DDDS/DNS server or servers in order to resolve said URN into a public IP address and port number and one or more SRV+TXT records, where the TXT field of the or each record contains metadata associated with a resource hosted or aggregated by said server node and a resource Uniform Resource Identifier, URI, or URI path;
   a processor configured to select an SRV+TXT record by matching the metadata stored in said memory to metadata contained in the TXT field(s); and
   a resource requester configured to send a resource request to said public IP address and port number and including the resource URI or URI path contained in the selected SRV+TXT record.

9. A gateway for interconnecting a private IP network and a public IP network in order to facilitate external access to a plurality of resources hosted or aggregated by a server node attached to the private IP network, the gateway comprising:
   a first address controller configured to obtain a private IP network IP address and port number allocated to said server node;
   a second address and port controller configured to (i) allocate a public IP network IP address and public network side port number to said server node, and (ii) cause the gateway to listen on the allocated public network side port number;
   a database and database controller configured to maintain at the gateway a mapping between the private side IP address and port number and the public side port number;
   a receiver configured to receive at the gateway from the server node, an advertisement of respective resource private Uniform Resource Identifier, URI, paths together with respective resource metadata;
   a registrar configured to register
      a) said public side IP address and port number, and
      b) said private URI paths, or said public URI paths mapped to the private URI paths, and respective resource metadata
   as resource records in a public network Dynamic Delegation Discovery System, DDDS, and Domain Name System, DNS, to allow Uniform Resource Name, URN, based queries to be resolved into public or private URI paths using DDDS and DNS lookup based upon resource metadata; and
   a request handler configured to:
      (i) receive access requests, destined for said public side IP address and port number, and containing one of said public or private URI paths,
      (ii) map, for each request, the public side port number to the corresponding private side IP address and port number, and, if required, for mapping the contained public URI path to a private URI path, and
      (iii) forward the connection request to said server node.

10. The gateway according to claim 9, wherein said registrar is configured to generate and register, for the server node, a DNS A record mapping a server node hostname to said public side IP address.

11. The gateway according to claim 9, wherein said registrar is configured to generate and register, for each said resource, a DNS SRV+TXT resource record having a TXT field including the resource metadata.

12. The gateway according to claim 11, wherein said TXT field additionally includes the resource public or private URI path.

13. The gateway according to claim 11, wherein said registrar is configured to generate and register, for the server node, one or more PTR records, the or each PTR records mapping a service type to a plurality of service instance names, with a one to one mapping between the PTR records and the SRV+TXT records.

14. The gateway according to claim 9, wherein said registrar is configured to generate and register, for the server node, DDDS NAPTR records including a terminal s record pointing to one or more PTR records.

15. The gateway according to claim 9, wherein said request handler uses port forwarding in the case that a request includes a private URI path.

16. The gateway according to claim 9, wherein said request handler uses port forwarding and URI path mapping in the case that a request includes a public URI path, in order to map the public URI path to a corresponding private URI path.

17. A method of resolving a Uniform Resource Name, URN, into a public IP address and port number and a private Uniform Resource Identifier, URI, or URI path in order to allow an external application to access a resource made available by a server node attached to a private IP network, the method comprising:
   registering a set of SRV+TXT records, mapped to respective resources made available by the server node, in a DDDS/DNS system, each record including within the TXT field a URI or URI path and metadata of the corresponding resource;
   providing all or a subset of said set of SRV+TXT records to said external application or to a further node;
   selecting an SRV+TXT record based upon metadata matching; and
   sending a resource request from the external application to said public IP address and port number and including the resource URI or URI path contained in the selected SRV+TXT record.

18. A method of facilitating access to a plurality of resources hosted or aggregated by a server node attached to a private IP network, via a gateway interconnecting the private IP network with a public IP network, the method comprising:

allocating a private IP network IP address to said server node and specifying a server node port number, and causing the server node to listen on the specified port number;

allocating a public IP network IP address and public network side port number to said server node, and causing the gateway to listen on the allocated public network side port number;

maintaining at the gateway a mapping between the private side IP address and port number and the public side port number;

receiving at the gateway from the server node, an advertisement of respective resource private Uniform Resource Identifiers, URI, paths together with respective resource metadata;

causing the gateway to register
  a) said public side IP address and port number, and
  b) said private URI paths or public URI paths mapped to the private URI paths and respective resource metadata as resource records in a public network Dynamic Delegation Discovery System, DDDS, and Domain Name System, DNS, to allow queries containing resource metadata to be resolved into public or private URI paths using DDDS and DNS lookup; and receiving access requests at said gateway, destined for said public side IP address and port number, and containing one of said public or private URI paths, and for each request mapping the public side port number to the corresponding private side IP address and port number and, if required, mapping the contained public URI path to a private URI path, and forwarding the connection request to said server node.

19. A method of operating a server node within a private IP network to host or aggregate a plurality of resources, the method comprising:

obtaining a private IP network IP address, allocating a server node port number to said resources, and causing the server node to listen on that server node port;

determining for each of said resources a resource private Uniform Resource Identifier, URI, or URI path together with resource metadata, and sending to a gateway, interconnecting the private IP network and a public IP network, an advertisement containing said private URIs or URI paths and respective resource metadata; and receiving requests at said server node port, for identifying private URI or URI paths included within the requests, and delivering resources corresponding to said URIs or URI paths.

20. A method of allowing an external application to access a resource hosted or aggregated by a server node attached to a private IP network, the method comprising:

storing a Uniform Resource Name, URN, and metadata concerning said resource;

communicating with a DDDS/DNS server or servers in order to resolve said URN into a public IP address and port number and one or more SRV+TXT records, where the TXT field of the or each record contains metadata associated with a resource hosted or aggregated by said server node and a resource Uniform Resource Identifier, URI, or URI path;

selecting an SRV+TXT record by matching the metadata stored in said memory to metadata contained in the TXT field(s); and sending a resource request to said public IP address and port number and including the resource URI or URI path contained in the selected SRV+TXT record.

21. A method of interconnecting a private IP network and a public IP network in order to facilitate external access to a plurality of resources hosted or aggregated by a server node attached to the private IP network, the method comprising:

obtaining a private IP network IP address and port number allocated to said server node;

allocating a public IP network IP address and public network side port number to said server node, and causing the gateway to listen on the allocated public network side port number;

maintaining at the gateway a mapping between the private side IP address and port number and the public side port number;

receiving at the gateway from the server node, an advertisement of respective resource private Uniform Resource Identifier, URI, paths together with respective resource metadata;

registering
  a) said public side IP address and port number, and
  b) said private URI paths or public URI paths mapped to the private URI and respective resource metadata as resource records in a public network Dynamic Delegation Discovery System, DDDS, and Domain Name System, DNS, to allow Uniform Resource Name, URN, based queries to be resolved into public or private URI paths using DDDS and DNS lookup based upon resource metadata;

receiving access requests, destined for said public side IP address and port number, and containing one of said public or private URI paths;

mapping, for each request, the public side port number to the corresponding private side IP address and port number, and, if required, mapping the contained public URI path to a private URI path; and forwarding the connection request to said server node.

22. A gateway for interconnecting a private IP network and a public IP network in order to facilitate external access to a plurality of resources hosted or aggregated by a server node attached to the private IP network, the gateway comprising:

an address and port controller configured to (i) allocate a public IP network IP address and public network side port number to said server node, and (ii) to cause the gateway to listen on the allocated public network side port number;

a receiver configured to receive at the gateway from the server node, an advertisement of respective resource private Uniform Resource Identifiers, URIs, together with respective resource metadata;

a database and database controller configured to maintain, at the gateway, a mapping between the private URIs and respective public URIs;

a registrar configured to registrar:
  a) said public side IP address and port number, and
  b) said public URIs and respective resource metadata as resource records in a public network Dynamic Delegation Discovery System, DDDS, and Domain Name System, DNS, to allow Uniform Resource Name, URN, based queries to be resolved into public URIs using DDDS and DNS lookup based upon resource metadata; and a request handler, configured to
(i) receive resource level requests, destined for said public side IP address and port number, and containing one of said public URIs,
(ii) map, for each request, the public URI to the corresponding private URI, (iii) generate a new resource level request including the mapped private URI, and
(iv) forward the new resource level requests to said server node.

23. A method of interconnecting a private IP network and a public IP network in order to facilitate external access to a plurality of resources hosted or aggregated by a server node attached to the private IP network, the method comprising:
   allocating a public IP network IP address and public network side port number to said server node, and causing the gateway to listen on the allocated public network side port number;
   receiving at the gateway from the server node, an advertisement of respective resource private Uniform Resource Identifiers, URIs, together with respective resource metadata;
   maintaining at the gateway a mapping between the private URIs and respective public URIs;
   registering
   a) said public side IP address and port number, and
   b) said public URIs and respective resource metadata
   as resource records in a public network Dynamic Delegation Discovery System, DDDS, and Domain Name System, DNS, to allow Uniform Resource Name, URN, based queries to be resolved into public URIs using DDDS and DNS lookup based upon resource metadata;
   receiving resource level requests, destined for said public side IP address and port number, and containing one of said public URIs;
   mapping, for each request, the public URI to the corresponding private URI,
   generating a new resource level request including the mapped private URI, and forwarding the new resource level requests to said server node.

* * * * *